No. 616,107. Patented Dec. 20, 1898.
G. H. HURLBUT.
MAGAZINE CAMERA.
(Application filed Mar. 7, 1898.)
(No Model.)
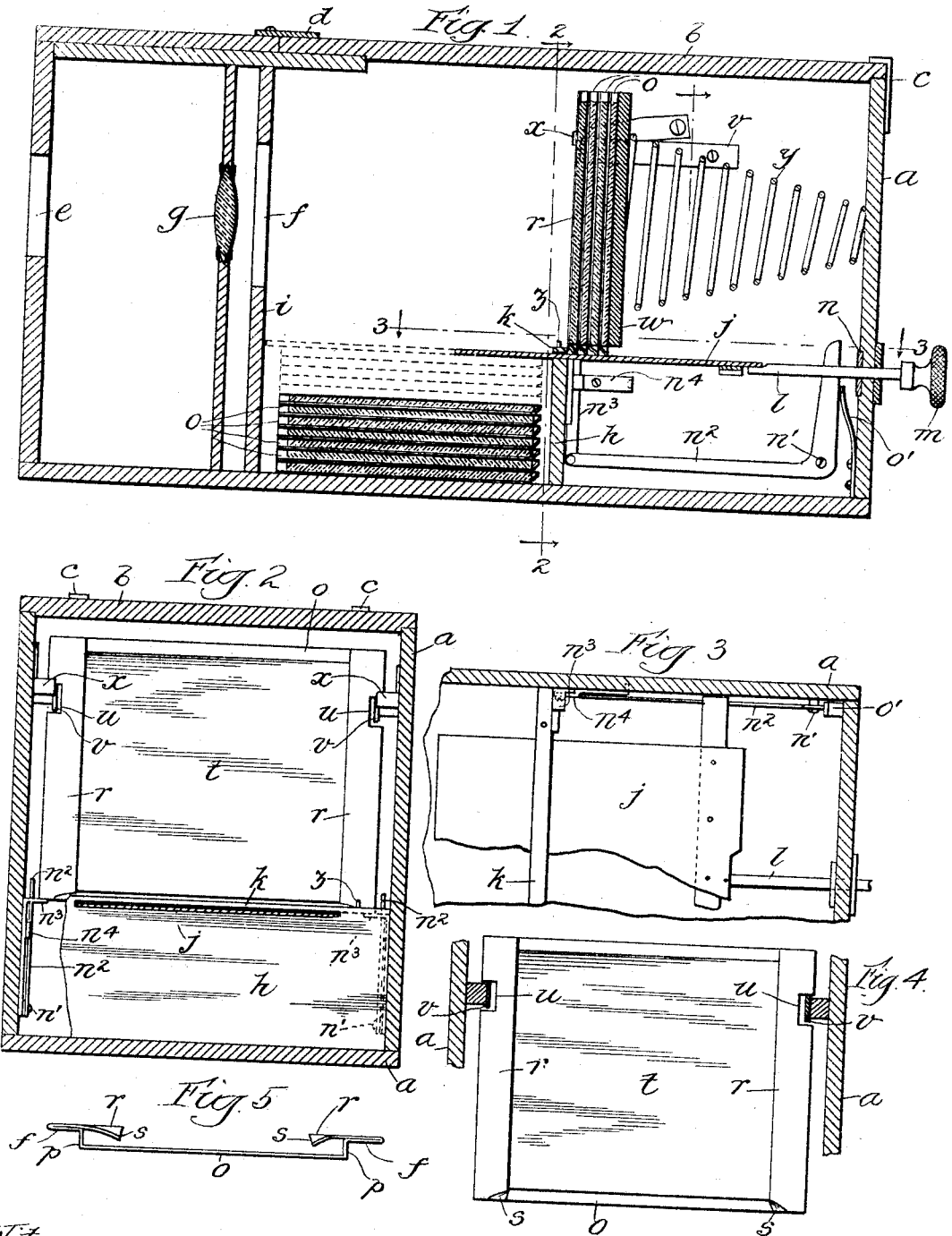

UNITED STATES PATENT OFFICE.

GEORGE H. HURLBUT, OF BELVIDERE, ILLINOIS, ASSIGNOR TO JAMES H. SMITH, OF CHICAGO, ILLINOIS.

MAGAZINE-CAMERA.

SPECIFICATION forming part of Letters Patent No. 616,107, dated December 20, 1898.

Application filed March 7, 1898. Serial No. 672,977. (No model.)

*To all whom it may concern:*

Be it known that I, GEORGE H. HURLBUT, of Belvidere, in the county of Boone and State of Illinois, have invented certain new and useful Improvements in Magazine-Cameras, of which the following is a full, clear, and exact description, reference being had to the accompanying drawings, forming a part of this specification, in which similar letters of reference in the different figures indicate like parts.

Figure 1 is a central vertical sectional view of a camera embodying the features of my invention. Fig. 2 is a transverse sectional view taken upon the line 2 2, Fig. 1, as viewed in the direction of the arrows there shown. Fig. 3 is a detail sectional view in plan, taken upon the line 3 3, Fig. 1. Fig. 4 is a sectional view in detail, taken upon the line 4 4, Fig. 1; and Fig. 5 is a bottom edge view of the plate-holder, showing means for retaining the plate in position when inserted therein.

My invention relates to hand-cameras of the magazine type, and contemplates a simple, cheap, compact, and durable construction whereby the sensitive plates may be successfully exposed as a result of a very simple manipulation on the part of the user.

A further object is to so construct the plate-holders and to provide such means for their manipulation as to prevent the fogging of any of the other plates during the exposure of any particular one and to avoid injury to the films by abrasion as a result of shifting the plates.

To these ends my invention consists in the combination of elements hereinafter more particularly described and claimed.

Referring to the drawings, $a$ represents the case of my improved camera, said case being provided with a lid $b$, which is preferably made detachable and is secured in place by means of the bent lugs $c\ c$, Figs. 1 and 2, and a button $d$ or other analogous device. Openings $e\ f$ through the end casing and an inner partition, respectively, admit light to the plate to be exposed through a lens $g$, arranged in any well-known manner. Any form of shutter or other approved means may be employed for admitting light to the lens. The height of the case is greater than that of the plates to be exposed therein, so that sufficient space is provided beneath the level of the lower edge of the plates as they are arranged in a vertical position for exposure to receive all of the plates of the camera. A transverse partition $h$, Figs. 1 and 2, of a height corresponding to the combined thickness of the plates and plate-holders with the plates therein is permanently secured in the lower portion of the case about midway between the partition $i$, which is placed back of the lens, and the rear end of the camera. The top of the partition $h$ forms a support for a flat horizontal sliding supporting-plate $j$, preferably made from sheet metal, which is secured from displacement by means of a parallel bar $k$, which is placed above said plate. The rear end of the plate is rigidly attached to the rod $l$, Figs. 1 and 3, which is extended through the back of the case and is provided upon its outer end with a knob $m$ to enable it to be actuated. Felt or other suitable packing $n$ is secured around the opening to prevent the admission of light.

Each of the plate-holders $o$ is made from a single piece of sheet metal, the body of which serves as a backing for the sensitive plate or film, said sheet metal being bent forward, as shown at $p\ p$, Fig. 5, to inclose the edges of the plate, thence laterally and outwardly in opposite directions, as shown at $q\ q$, and thence inwardly and parallel with the parts $q\ q$ a sufficient distance to form flanges $r\ r$, which engage the plates and hold them securely against the back. The lower edges of the flanges $r$ are bent inwardly, as shown at $s\ s$, so as to form stops at the bottom to prevent the plates $t$ from falling out. Notches $u\ u$ are formed in the sides of the plate-holders, respectively, near the top, to engage with horizontal guides $v\ v$, which are rigidly attached to opposite sides of the case in the chamber back of the partition $h$. The guides are of sufficient length to receive the desired number of plate-holders, together with a follower $w$, Fig. 1, which is notched upon the sides in the same manner as the plate-holders, so as to engage the guides $v$. The plate-holders with the plates therein are arranged in a vertical position, as shown in said last-named figure, with the plates facing forward, being inserted from the rear ends of the guides $v$, so that the bottoms of the plate-holders rest upon the sliding plate $j$. The plates are sustained in front by causing the foremost one to engage with the cross-bar $k$ at the bottom and with stops $x$ $x$ near the top, which consist of metal pieces attached to opposite sides of the case and bent inwardly, so as to engage the laterally-projecting edges of the plate-holders a short distance above the notches $u$, as clearly shown in Fig. 1. The stops $x$ are placed slightly forward of the front ends of the guides $v$, the distance being less than the thickness of a plate-holder, so that the foremost plate is free to be moved vertically without interfering with the guides; but when said plate-holder is raised, so that the stops $x$ register with the notches $u$, the top of the plate-holder, being unsustained, is free to fall forward. A spiral spring $y$ inserted between the follower $w$ and the back of the case serves to push the plates forward. Pins $z$, Figs. 1 and 2, serve to prevent the bottom of the plate from being moved forward when raised above the bar $k$, so it is obvious that when the foremost plate is lifted sufficiently to disengage it from the stops $x$ the action of the follower-spring $y$ serves to push all of the plates forward, which causes the foremost one to fall outwardly from the top, the bottom being momentarily arrested by the pins $z$. Inasmuch as the supporting-plate $j$ is at this time drawn back, so that its forward end is flush with the partition $h$, the plate is free to fall to the bottom of the case in the space in front of the partition $h$, as shown in Fig. 1.

While I have designated $j$ as a "supporting-plate," I do not wish to be understood as regarding it as essential for the support of the plates in the exposing-chamber, although I prefer that the bottoms of the plate-holders should rest therein; but inasmuch as they may be wholly supported upon the guides this is not necessary.

The following-described mechanism is employed for releasing the exposed plate: At each side of the case, near the bottom, is pivoted at $n'$ an elbow-lever $n^2$, one arm of which is vertical and in engagement with a spring $o'$, the tension of which serves to hold the lever normally in the position shown in Fig. 1. To the forward end of each lever $n^2$ is pivoted a vertical plunger $n^3$, which is retained in position by means of a suitable guide $n^4$, attached to the side of the case. Each of said plungers is bent inwardly at the top, as shown in Fig. 2, so as to engage the bottom of the foremost plate-holder. A cross-bar $j'$, Figs. 1 and 3, is rigidly attached to the rear of the supporting-plate $j$, so as to engage with the vertical arms of the elbow-levers when the knob $m$ is drawn back. This action compresses the springs $o'$, the forward ends of the lever-arms, raises the plungers $n^3$, and lifts the foremost plate-holder until it is released from engagement with the stops $x$, when the latter falls into the position described in front of the partition $h$, as shown in Fig. 1. When all of the plates are thus exposed, the supporting-plate $j$ is pushed forward to its full limit, as indicated in dotted lines, thereby serving to retain the exposed plates in the bottom of the case.

The follower-spring and follower may be removed when charging the magazine with a new set of plates.

Having thus described my invention, I claim—

1. A magazine-camera in which are combined an exposing-chamber and a receiving-chamber for the exposed plates, the latter being in front of and below the level of the exposing-chamber, guides upon the sides of the exposing-chamber adapted to engage with notches in the edges of the plate-holders, stops arranged to engage the foremost plate above said notches, a spring-actuated follower for pushing the plates forward, and means for lifting the foremost plate to bring said stops into registration with said notches, substantially as described.

2. A magazine-camera in which are combined an exposing-chamber and a receiving-chamber for the exposed plates, the latter being in front of and below the level of the exposing-chamber, guides upon the sides of the exposing-chamber adapted to engage with notches in the edges of the plate-holders, stops arranged to engage the foremost plate above said notches, a spring-actuated follower for pushing the plates forward, a longitudinal horizontal slide operated from without the camera, said slide being arranged in a plane beneath the plates to be exposed and above those which have been exposed, and means for lifting the foremost plate to bring said stops into registration with said notches, substantially as described.

In testimony whereof I have signed this specification, in the presence of two subscribing witnesses, this 26th day of February, 1898.

GEO. H. HURLBUT.

Witnesses:
D. H. FLETCHER,
S. J. JONES.